United States Patent
Stenlåås et al.

(10) Patent No.: US 10,352,256 B2
(45) Date of Patent: Jul. 16, 2019

(54) REGULATION OF CONCENTRATION/FRACTION OF SUBSTANCES IN AN EXHAUST STREAM

(71) Applicant: Scania CV AB, Södertälje (SG)

(72) Inventors: Ola Stenlåås, Södertälje (SE); Fredrik Roos, Segeltorp (SE)

(73) Assignee: SCANIA CV AB (SE)

( * ) Notice: Subject to any disclaimer, the term of this patent is extended or adjusted under 35 U.S.C. 154(b) by 37 days.

(21) Appl. No.: 14/433,067

(22) PCT Filed: Oct. 2, 2013

(86) PCT No.: PCT/SE2013/051148
§ 371 (c)(1),
(2) Date: Apr. 2, 2015

(87) PCT Pub. No.: WO2014/055021
PCT Pub. Date: Apr. 10, 2014

(65) Prior Publication Data
US 2015/0300277 A1    Oct. 22, 2015

(30) Foreign Application Priority Data

Oct. 2, 2012 (SE) .................. 1251105
Oct. 2, 2013 (SE) .................. 1351158

(51) Int. Cl.
*F02D 41/14* (2006.01)
*B60W 30/188* (2012.01)
(Continued)

(52) U.S. Cl.
CPC ......... *F02D 35/0015* (2013.01); *B60W 10/06* (2013.01); *B60W 10/11* (2013.01);
(Continued)

(58) Field of Classification Search
CPC ................... F16H 2061/0018; F16H 2061/0075–2061/0096;
(Continued)

(56) References Cited

U.S. PATENT DOCUMENTS 4,408,293 A    10/1983 Avins ..................... 180/179
5,588,888 A    12/1996 Magharious ............ 181/235
(Continued)

FOREIGN PATENT DOCUMENTS

DE           10355412 A1   7/2005
DE    10 2004 017115       10/2005
(Continued)

OTHER PUBLICATIONS

International Search Report dated Feb. 7, 2014 in corresponding PCT International Application No. PCT/SE2013/051148.
(Continued)

*Primary Examiner* — Jacob M Amick
*Assistant Examiner* — Michael A Kessler
(74) *Attorney, Agent, or Firm* — Ostrolenk Faber LLP

(57) ABSTRACT

A method for regulation of a concentration/fraction of one or several substances comprised in an exhaust system in a motor vehicle through control of its driveline: The driveline includes a combustion engine which may be connected to a gearbox via a clutch device, wherein the gearbox has several discrete gears, and an exhaust system for removal of an exhaust stream from the combustion engine; the method includes obtaining one or several first parameters $P_1$ related to at least one first concentration/fraction $C_1/X_1$ of one or several substances comprised in the exhaust system; and controlling the gearbox, and thus an operating point in the combustion engine, based on the parameters $P_1$ for regulation of a concentration/fraction $C_{Ex}/X_{Ex}$ of one or several substances in the said exhaust system. Further, a computer (Continued)

program, a computer program product, a system and a motor vehicle comprising such a system are disclosed.

27 Claims, 5 Drawing Sheets

(51) Int. Cl.
| | |
|---|---|
| *F16H 61/02* | (2006.01) |
| *F16H 59/74* | (2006.01) |
| *F02D 35/00* | (2006.01) |
| *B60W 10/06* | (2006.01) |
| *B60W 10/11* | (2012.01) |
| *F02D 29/02* | (2006.01) |
| *F02D 41/00* | (2006.01) |

(52) U.S. Cl.
CPC ......... *B60W 30/1882* (2013.01); *F02D 29/02* (2013.01); *F02D 41/1444* (2013.01); *F16H 61/0213* (2013.01); *F02D 41/0002* (2013.01); *F02D 41/0052* (2013.01); *F02D 41/146* (2013.01); *F02D 41/1445* (2013.01); *F02D 41/1452* (2013.01); *F02D 41/1454* (2013.01); *F02D 41/1459* (2013.01); *F02D 41/1466* (2013.01); *F02D 2041/1468* (2013.01); *F16H 59/74* (2013.01); *F16H 2061/0232* (2013.01)

(58) Field of Classification Search
CPC ............... F16H 2061/0216–2061/0234; F16H 2061/0293; F16H 61/0202–61/0213; F16H 61/0262–61/0267; Y10T 477/60–477/623; Y10T 477/663; F02D 35/0015; F02D 41/0002; F02D 41/1438; F02D 41/1444; F02D 41/1452–41/1459; F02D 41/146–41/1467; F02D 41/02–41/0295; F02D 41/345; F02D 2041/1468–2041/147; F02D 2200/70–2200/702; B60W 30/1882; B60W 10/04; B60W 10/06
USPC ......... 477/100; 701/87–88, 101–109; 60/274
See application file for complete search history.

(56) References Cited

U.S. PATENT DOCUMENTS

| | | | |
|---|---|---|---|
| 6,154,701 A | 11/2000 | Löffler et al. .................. 701/54 |
| 6,983,726 B1 | 1/2006 | Luo ........................... 123/179.2 |
| 7,628,009 B2 * | 12/2009 | Hu ...................... F02D 41/0215 477/100 |
| 2003/0037538 A1 | 2/2003 | Rendahl ......................... 60/276 |
| 2004/0020194 A1 * | 2/2004 | Nishimura ............. F01N 3/023 60/297 |
| 2004/0035402 A1 | 2/2004 | Collins ..................... 123/568.14 |
| 2004/0261401 A1 | 12/2004 | Ohkl ............................... 60/285 |
| 2006/0020386 A1 | 1/2006 | Kang ............................ 701/114 |
| 2007/0079605 A1 * | 4/2007 | Hu ....................... F01N 3/0842 60/295 |
| 2008/0305929 A1 * | 12/2008 | Koga ................... B60W 30/192 477/115 |
| 2009/0301451 A1 | 12/2009 | Ito ................................ 123/674 |
| 2011/0000191 A1 | 1/2011 | Scappatura .................... 60/274 |
| 2011/0120100 A1 | 5/2011 | Yin ............................... 60/295 |
| 2011/0202253 A1 | 8/2011 | Perry et al. ................... 701/102 |
| 2011/0296833 A1 * | 12/2011 | Mardberg Jozsa ... B60W 10/06 60/605.2 |
| 2012/0046841 A1 | 2/2012 | Wurthner et al. |
| 2012/0203434 A1 * | 8/2012 | Sujan .................... B60W 50/14 701/64 |
| 2012/0216509 A1 | 8/2012 | Sujan et al. .................... 60/274 |
| 2013/0036670 A1 | 2/2013 | McAlister .................. 48/197 R |
| 2013/0190945 A1 | 7/2013 | Koto ................................ 701/1 |

FOREIGN PATENT DOCUMENTS

| | | | |
|---|---|---|---|
| DE | 102011089847 A1 | 6/2012 | |
| EP | 0 474 401 A2 | 3/1992 | |
| EP | 1852635 A1 | 11/2007 | |
| EP | 2 381 076 A1 | 10/2011 | |
| EP | 2 591 968 | 5/2013 | |
| GB | 1242590 | 8/1971 | |
| WO | WO 2005/090834 A1 | 9/2005 | |
| WO | WO 2011/160878 | 12/2011 | |
| WO | WO 2011162705 A1 * | 12/2011 | .......... B60W 30/143 |

OTHER PUBLICATIONS

International Search Report dated Feb. 7, 2014 issued in International patent application No. PCT/SE2013/051146.
International Preliminary Report on Patentability dated Jan. 7, 2015 issued in International patent application No. PCT/SE2013/051146.
European Communication Pursuant to Article 94(3) EPC, dated Sep. 5, 2018, in corresponding European Patent Application No. 13843600.1. Total 5 pages.

* cited by examiner

REGULATION OF CONCENTRATION/FRACTION OF SUBSTANCES IN AN EXHAUST STREAM

CROSS-REFERENCE TO RELATED APPLICATIONS

The present application is a 35 U.S.C. §§ 371 national phase conversion of PCT/SE2013/051148, filed Oct. 2, 2013, which claims priority of Swedish Patent Application No. 1251105-1, filed Oct. 2, 2012, the contents of which are incorporated by reference herein and Swedish Patent Application No. 1351158-9, filed Oct. 2, 2013, the contents of which are incorporated by reference herein. The PCT International Applications were published in the English language.

TECHNICAL FIELD

The present invention pertains to a method for the regulation of a concentration/fraction of one or several substances present in an exhaust stream by control of a motor vehicle's driveline. Further, the invention pertains to a computer program, a computer program product, a system and a motor vehicle comprising such a system.

BACKGROUND OF THE INVENTION

Laws and regulations for exhaust emission from motor vehicles have been drafted in many jurisdictions because of pollution and air quality, primarily in urban areas. These laws and regulations often consist of sets of requirements which define acceptable limits for exhaust emissions (emission standards) for motor vehicles equipped with combustion engines. For example, emission levels of nitrogen oxides ($NO_x$), hydrocarbons (HC), carbon monoxide (CO) and particles are often regulated for most types of vehicles.

In order to meet such emission standards, the exhausts caused by the combustion in combustion engines are aftertreated (purified). By way of example, a so-called catalytic purification process may be used, which is why aftertreatment systems usually comprise a catalyst. Further, aftertreatment systems may alternatively or in combination with one or several catalysts comprise other components, such as one or several particulate filters.

FIG. 1 shows the combustion engine 101 of a motor vehicle 100, where the exhaust stream generated by the combustion is led via a turbocharger 220. The exhaust stream is subsequently led via a pipe 204 (indicated with arrows) to a particulate filter (Diesel Particulate Filter, DPF) 202 via a diesel oxidation catalyst (DOC) 205. Further, the aftertreatment system comprises an SCR catalyst 201 (Selective Catalytic Reduction, SCR), arranged downstream of the particulate filter 202, which uses ammonia ($NH_3$), or a composition from which ammonia may be generated/formed, as an additive for the reduction of the quantity of nitrogen oxides $NO_x$. The particulate filter 202 may alternatively be arranged downstream of the SCR catalyst 201. The diesel oxidation catalyst DOC 205 has several functions and uses the surplus of air which the engine process generally creates in the exhaust stream as a chemical reactor jointly with a precious metal coating in the diesel oxidation catalyst. The diesel oxidation catalyst is normally primarily used to oxidise remaining hydrocarbons and carbon monoxide in the exhaust stream into carbon dioxide, water and heat, and conversion of nitrogen monoxide into nitrogen dioxide.

In connection with combustion of fuel in the combustion engine's combustion chamber (cylinders) soot particles are formed. For this reason, the particulate filter is used to catch soot particles and thus functions so that the exhaust stream is led through a filter structure where soot particles are caught from the passing exhaust stream and stored in the particulate filter. The particulate filter is filled with soot as the vehicle is driven and sooner or later the filter must be emptied of soot, which is usually achieved with the help of so-called regeneration. The regeneration entails that the soot particles (mainly carbon particles) be converted into carbon dioxide and/or carbon monoxide in one or several chemical processes. Regeneration may occur in various ways and may, for example, with the help of so-called $NO_2$-based regeneration, often also called passive regeneration, or through so-called oxygen ($O_2$)-based regeneration, also called active regeneration.

In connection with passive regeneration, nitrogen oxide and carbon oxide are formed in a reaction between carbon and nitrogen dioxide according to e.g. equation 1:

$$NO_2 + C = NO + CO \qquad (1)$$

The passive regeneration, however, is heavily dependent on the availability of nitrogen dioxide. If the supply of nitrogen dioxide is reduced, the regeneration speed is also reduced. The supply of nitrogen dioxide may e.g. be reduced if the formation of nitrogen dioxide is hampered, which may e.g. occur if one or several components in the aftertreatment system are contaminated by sulphur, which normally occurs in at least some types of fuel, e.g. diesel. Competing chemical reactions also hamper the nitrogen dioxide transformation.

The advantage of passive regeneration is that desired reaction speeds and thus the speed at which the filter is emptied are achieved at lower temperatures. Typically, regeneration of the particulate filter during passive regeneration occurs at temperatures in the range of 200° C. to 500° C., although temperatures in the higher part of this interval are normally preferable. Notwithstanding this, compared to the significantly lower temperature interval in active regeneration, this constitutes a great advantage if e.g. an SCR catalyst is present, since there is no risk that such a high temperature level is achieved that there is a risk of damage to the SCR catalyst. Nevertheless, it is important that a relatively high temperature is achieved in order for an effective passive regeneration to take place.

In the event of active regeneration, so-called oxygen ($O_2$)-based regeneration, a chemical process occurs mainly according to equation 2:

$$C + O_2 = CO_2 + \text{heat} \qquad (2)$$

Thus, carbon plus oxygen are converted, in active regeneration, into carbon dioxide plus heat. This chemical reaction, however, is heavily temperature-dependent and requires relatively high filter temperatures in order for a significant reaction speed to arise at all. Typically, a minimum particulate filter temperature of 500° C. is required, but preferably the filter temperature should be even higher in order for regeneration to occur at the desired speed. The reaction speed for chemical reactions, e.g. the reactions according to equation 1 and 2 above, are also dependent on the concentration of the reactants. If, for example, the concentration of any reactant is low, the reaction speed will be low, and if a reactant is missing, no reaction at all will occur.

Often the maximum temperature which may be used in active regeneration is limited by tolerances for some of the components comprised in the aftertreatment system/exhaust system. For example, often the particulate filter 202 and/or (where applicable) a subsequent SCR catalyst have constructional limitations with regard to the maximum temperature to which they may be subjected. This entails that the active regeneration may have a maximum component temperature which is often undesirably low. Simultaneously, a very high minimum temperature is required in order for any usable reaction speed to arise at all. In active regeneration, the soot load is normally essentially totally burned in the particulate filter 202. This means that a total regeneration of the particulate filter is obtained, following which the soot level in the particulate filter is essentially 0%. Today it is increasingly common for vehicles to be equipped, in addition to a particulate filter 202, with an SCR catalyst 201, which is why active regeneration may entail problems in the form of overheating for the subsequent SCR catalyst treatment process. It is therefore crucial to be able to control a rapid rise in temperature in the exhaust flows before the contact of the SCR catalyst. Such a rapidly rising temperature may e.g. be the result of a runaway oxidation in the particulate filer (DFP), which may be inhibited or stopped if the concentration of oxygen into the particulate filter is reduced to a low or zero level. As mentioned above, it is also important, however, that the temperature be regulated in other components in the exhaust system, for example in order to prevent or inhibit local or global excess temperature in the particulate filter (DPF), etc.

Depending on how a vehicle is driven, the concentration/fraction for the exhaust stream resulting from the combustion will vary. If the combustion engine is working hard, the exhaust stream will have a higher concentration/fraction of combustion products and lower concentrations/fractions of combustion reactants, and if the load on the combustion engine is relatively, low the exhaust stream's concentration/fraction will be essentially the reverse. If the vehicle is driven for a longer period of time in such a manner that the exhaust stream contains relatively high concentrations/fractions of undesired combustion products, such as e.g. sulphur oxides, a degradation of the function of the diesel oxidation catalyst 205 will occur because the reaction of the sulphur, which is usually present in the fuel in various forms, with the active coating of the diesel oxidation catalyst 205, usually comprising one or several precious metals or other applicable metals such as e.g. aluminium. These problems usually arise at low (150° C.) to medium (300° C.) temperatures. At temperatures below 150° C. to 250° C., for example, an SCR catalyst will not function well. On the other hand, if the vehicle is driven for a longer period of time in such a manner that the exhaust stream's temperature maintains relatively high temperatures, this means that active regeneration may take place at the desired speed. However, the temperature in the exhaust stream may not exceed a maximum permitted temperature so that heat sensitive components in the aftertreatment system are damaged as previously mentioned. It is then particularly important to ensure that the concentration of $NO_x$ is maintained at low levels and that the balance $NO2/NO_x$ is optimal.

The concentration C of a substance in a gas may be expressed according to the equation:

$$C = \frac{N}{V},$$

where N is the number of molecules of a given substance and V is the volume, i.e. the number of molecules of a given substance in a given volume. The total concentration $C_{Tot}$, which increases in an ideal gas if the pressure has increased and the temperature is falling, is expressed by the general gas law as $$C_{Tot} = \frac{N_{Tot}}{V},$$

where $N_{Tot}$ is the total number of molecules. The fraction X of a substance is expressed as the relationship between the concentration C and the fraction X as: $C = X \cdot C_{Tot}$. If no chemical reactions take place, the fraction which specifies the proportion of molecules in a volume which belongs to a certain substance is not changed unless additional molecules are mixed with the original volume. This may e.g. occur through diffusion and/or through remixing of gas elements through so-called turbulence. The new molecules which are mixed in may e.g. come from urea and/or diesel injected into the exhaust pipe, which may be evaporated or reacted. They may also come from previously stored substances which are released, e.g. condensed water which is dragged along with the exhaust stream and/or evaporated. Examples of substances in the exhaust system which may be regulated are: carbon monoxide (CO) and nitrogen oxide (NO) which react e.g. with oxygen into carbon dioxide (CO2) and nitrogen dioxide (NO2) respectively.

BRIEF DESCRIPTION OF THE INVENTION

One objective of the present invention is to provide a solution which wholly or partly resolves problems and/or disadvantages with solutions for the regulation of a concentration/fraction of one or several substances comprised in an exhaust stream according to prior art.

According to a first aspect of the invention, the above mentioned objective is achieved with a method for the regulation of a concentration/fraction of one or several substances in an exhaust stream in a motor vehicle through control of its driveline. The motor vehicle comprises: a driveline comprising a combustion engine which may be connected to an automatic gearbox or a manual gearbox via a clutch device, where the automatic gearbox or the manual gearbox has several discrete gears, and an exhaust system arranged for the removal of an exhaust stream from the combustion engine; wherein the method comprises the step:

controlling the automatic gearbox or the manual gearbox, and thus an operating point in the combustion engine, based on the one or several first parameters $P_1$ for the regulation of a concentration/fraction $C_{Ex}/X_{Ex}$ of one or several substances in the exhaust stream, wherein at least one of the one or several first parameters $P_1$ are a first concentration-/fraction difference between the first concentration/fraction $C_1/X_1$ in the exhaust stream and a reference concentration/-fraction $C_{Ref}/X_{Ref}$.

According to a second aspect of the invention, the above objective is achieved with a system arranged for the control of one or several functions in a motor vehicle, which motor vehicle comprises: a driveline comprising a combustion engine which may be connected to an automatic gearbox or to a manual gearbox via a clutch device, where the automatic gearbox or the manual gearbox has several discrete gears, and an exhaust system arranged for the removal of an exhaust stream from the combustion engine; where the system comprises a control device arranged to control the automatic gearbox or the manual gearbox, and thus an operating point in the combustion engine, based on the one or several first parameters $P_1$ for the regulation of a concentration/fraction $C_{Ex}/X_{Ex}$ of one or several substances in the exhaust stream, where at least one of the one or several first parameters $P_1$ are a first concentration/fraction difference between the first concentration/fraction $C_1/X_1$ in the exhaust stream and a reference concentration/fraction $C_{Ref}/X_{Ref}$.

The above mentioned system is preferably arranged in a motor vehicle, such as a bus, a truck or another similar motor vehicle.

With a method or a system according to the present invention, an improved solution for the regulation/control of a concentration/fraction of one or several substances in an exhaust stream in a motor vehicle is obtained. For example, the invention enables regulation of the concentration/fraction of one or several substances comprised in such operating conditions where regulation of the concentration/fraction has not been possible or sufficient with solutions according to prior art.

One method or a system for the regulation of the concentration/fraction of substances in an exhaust stream according to the present invention facilitates that components in the exhaust system, such as particulate filters and catalysts, may work efficiently since the concentration/fraction of substances in the exhaust system may efficiently and accurately be adjusted to the components' optimal working concentration/fraction. The risk that components in the exhaust system may be damaged due to e.g. overheating and contamination is thus also reduced.

Further, the invention provides a more fuel effective method for achieving a desired concentration/fraction of substances in the exhaust flow, or for maintaining a current concentration/fraction of substances in the exhaust stream compared to prior art. By regulating the concentration/fraction of those substances through control of the driveline with one or several first parameters $P_1$ according to the invention, measures resulting in big fuel consumption may be avoided, such as activation of an external heater or engine control prioritising the concentration/fraction over the engine's efficiency.

Another advantage of the invention is that it is not necessary to equip the vehicle with further parts/components in order to achieve the advantages of the invention since already existing parts/components in the vehicle may be used, which entails a great cost saving.

Further advantages and embodiments of the invention are set out in the following detailed description.

BRIEF DESCRIPTION OF FIGURES

The present invention is described with reference to the enclosed figures where.

DETAILED DESCRIPTION OF THE INVENTION

Figure 2:
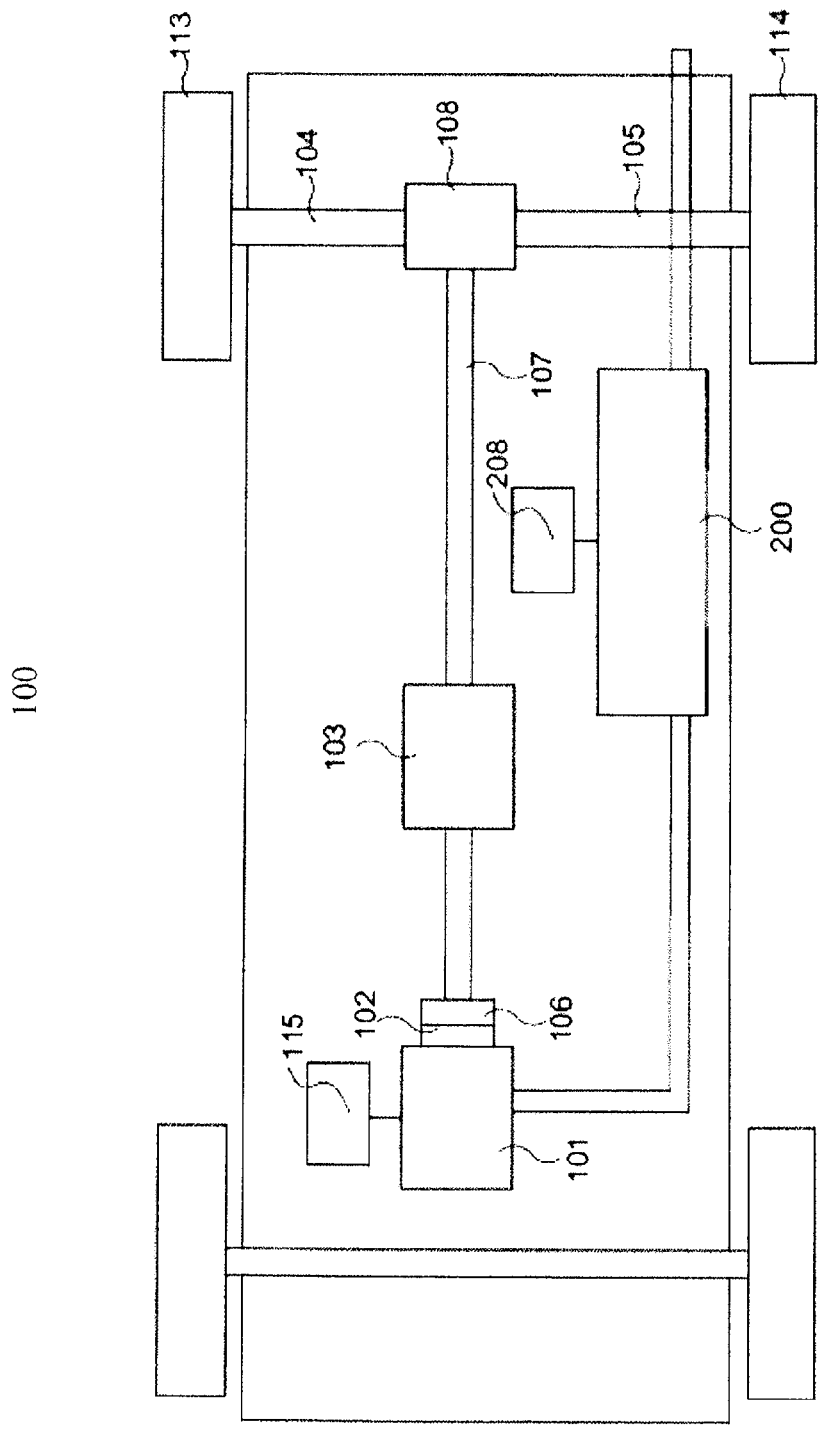
FIG. 2 is a schematic diagram of an example vehicle.

FIG. 2 is a schematic diagram of a motor vehicle 100, such as a truck, bus or other similar motor vehicle. The vehicle 100 schematically shown in FIG. 2 comprises a pair of front wheels 111, 112 and a pair of rear wheels including driving wheels 113, 114. The vehicle also comprises a driveline with a combustion engine 101 (e.g. a diesel engine), which via an output shaft 102 on the combustion engine is connected to a gearbox 103, for example via a clutch device 106. The clutch device may consist of an automatically controlled clutch and be controlled by the vehicle's control system via a control device 115, 208, which may also control the gearbox 103. An output shaft 107 from the gearbox 103 drives the driving wheels 113, 114 via a final drive 108, such as a differential, and drive shafts 104, 105 connected to the final drive 108.

Figure 1:
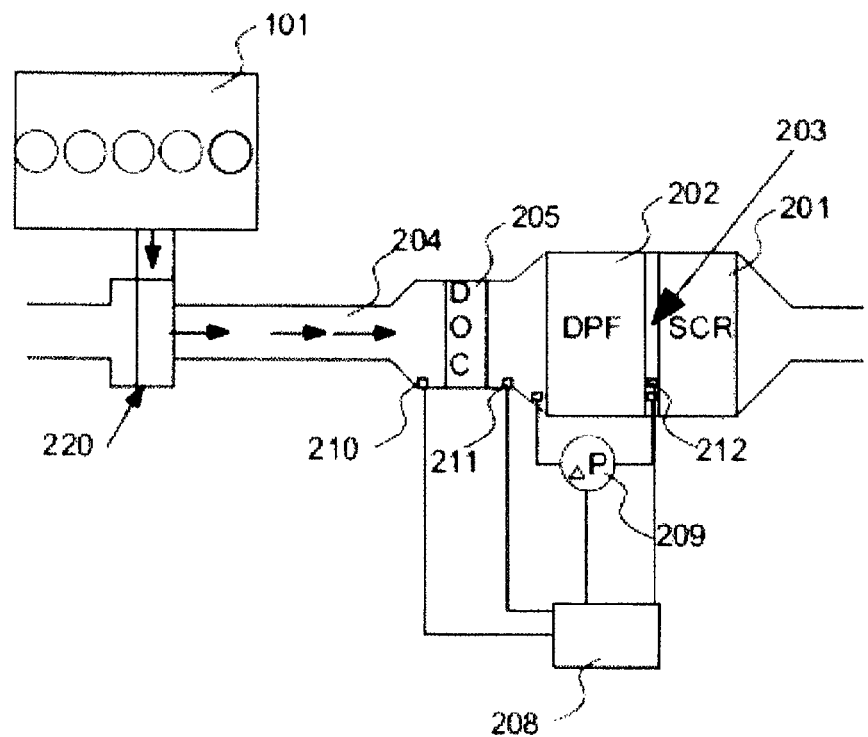
FIG. 1 is a schematic diagram of a system comprising a combustion engine and an exhaust system.

The vehicle 100 also has an exhaust system configured to remove an exhaust stream generated by the combustion engine 101 on combustion in the engine. As shown in FIG. 1, the exhaust system may comprise an aftertreatment system (exhaust purification system) for the treatment (purification) of exhaust emissions from the combustion engine 101. However, it is not necessary for the exhaust system to comprise such an aftertreatment system, and in addition the exhaust system may comprise other parts/components such as a turbo, a silencer system, and gas flow systems for EGR.

The gearbox 103 is usually a manual gearbox; an automatic gearbox, such as an automatic gearbox, automatic manual gearbox (Automatic Manual Transmission, AMT) or double clutch gearbox (Double Clutch Transmission, DCT); or a continuous variable gearbox (Continuous Variable Transmission/Infinitely Variable Transmission, CVT/IVT).

A manual gearbox 103 is a gearbox with a number of discrete gears and is arranged to be manoeuvred by the driver for engagement or disengagement of gears (e.g. forward and reverse gears).

An automatic gearbox also has a number of gears, i.e. it comprises several discrete gears. However, it differs from a manual gearbox in that it is controlled/manoeuvred by a control system comprising one or several control devices, also called ECUs (Electronic Control Unit). The control device or ECU is arranged to control the gearbox 103, for example on a shift from gear selection at a certain speed with a certain running resistance. Also, the ECU may measure the speed and torque of the engine 101 and the condition of the gearbox. Information from the engine or the gearbox may be sent to the ECU in the form of electric communications signals via, for example a so-called CAN (Controller Area Network) bus installed in the motor vehicle 100.

The gearbox 103 has been illustrated schematically as one device. However, it should be noted that the gearbox may also physically consist of several cooperating gearboxes, for example a so-called range gearbox, a main gearbox and a split gearbox, which are arranged along the vehicle's driveline. Gearboxes according to the above may comprise any number of suitable discrete gears. Today's gearboxes for heavy goods vehicles usually have twelve forward gears, two reverse gears and one neutral gear.

A continuously variable gearbox, also called a CVT gearbox or IVT gearbox, is another type of well known gearbox which differs from the previous gearbox types since it does not have a number of discrete gears corresponding to different gearings but instead has a continuously variable gearing. In this type of gearbox, gearing may thus within certain limits be controlled to the exact gearing desired.

In relation to upshifts and downshifts, an upshift means that a higher possible gear in the gearbox is selected while a downshift means that a lower possible gear in the gearbox is selected. This applies to gearboxes with several discrete gears. For continuously variable gearboxes, "fictitious" gear steps may be defined and shifting gears may occur in the same manner as for a gearbox with discrete gear steps. However, the usual way of controlling such a continuously variable gearbox is to let the gearing vary depending on other relevant parameters. The control of such a gearbox is usually integrated with the control of the combustion engine's speed and torque, i.e. its operating point. A common method is to let control of the continuously variable gearbox be based on a current driving power requirement, e.g. calculated based on a gas pedal position and a speed for the vehicle, and which operating point that gives the best effect in order to achieve the driving power requirement. Gearing in the continuously variable gearbox thus becomes a result of which engine speed leads to the optimal operating point for the current driving power requirement. Aspects other than efficiency may also be taken into account in the choice of operating point for the engine. These may e.g. be driveability-related aspects, such as torque response times, i.e. how long it would take to achieve a higher driving wheel torque, or how much more torque may be obtained during a certain time period.

Further, a so-called activation of coasting of the vehicle entails that the vehicle's engine 101 be mechanically disconnected from the vehicle's driving wheels 110, 111, i.e. that the driveline is opened, while deactivation of coasting entails that the driveline is closed. Disconnection of the driving wheels from the engine may, for example, be achieved by putting the gearbox 103 in a neutral gear, or by opening the clutch device 106. Then essentially no power is transmitted through the gearbox from the engine to the driving wheels during coasting.

In the present invention, it is assumed that the driveline of the motor vehicle 100 comprises an automatic gearbox or a manual gearbox of the type described above with several discrete gears. Further, it is assumed that the motor vehicle comprises a combustion engine 101 and an exhaust system connected to the combustion engine for removal of an exhaust stream from the combustion engine.

One method according to the present invention for the regulation of a concentration/fraction of one or several substances comprised in the exhaust stream comprises the step: controlling an automatic gearbox or a manual gearbox, and thus an operating point in a combustion engine, based on one or several first parameters $P_1$ for the regulation of a concentration/fraction $C_{Ex}/X_{Ex}$ of one or several substances comprised in the exhaust stream, where at least one of the one or several first parameters $P_1$ is a first concentration/fraction difference between the first concentration/fraction $C_1/X_1$ in the exhaust stream and a reference concentration/fraction $C_{Ref}/X_{Ref}$. The control of the automatic gearbox or the manual gearbox preferably takes place through control of the gear in the automatic gearbox or the manual gearbox. The reference concentration/fraction $C_{Ref}/X_{Ref}$ is a desired concentration/fraction in the exhaust stream.

Control of the automatic gearbox means that a control system controls the gearbox as described above. Control of the manual gearbox (or an automatic gearbox in manual mode) means, instead, that a driver of the vehicle changes gears as guided by a presentation/indication system which is arranged to present/indicate a suitable desired gear to the driver according to the previous algorithm for gear selection. Thus, the presentation/indication system entails a driver support for the driver ("driver support") when shifting gears while driving the vehicle. The presentation may, for example, involve visual, audio or tactile presentation/indication or combinations thereof with suitable arrangements for this purpose.

The one or several first parameters $P_1$ are preferably used as in-parameters for a control algorithm arranged to control the concentration/fraction in the exhaust stream at a desired value through control of the driveline (e.g. gearbox and clutch). The control algorithm may be of many different types and may be an algorithm which only looks at the first parameter and uses one or several threshold values (e.g. one higher and one lower threshold value) to determine which control measure should be taken. A more advanced control algorithm also takes into account other variables as explained in the description below.

With the use of one or several parameters $P_1$ for the regulations of a concentration/fraction of one or several substances in the exhaust stream through control of the driveline, the possibility of maintaining the concentration/fraction into or out of e.g. a catalyst at the desired level is obtained, which thus guarantees that certain emission levels from the vehicle are below statutory limits. This is also a fuel effective manner of controlling the concentration/fraction of substances compared to other measures such as deteriorating the combustion efficiency in the engine.

The exhaust stream is the gas stream which leaves a combustion engine and is led out via the exhaust system's different components to the surrounding atmosphere. The exhaust stream may to some extent be recirculated (so-called EGR), expanded over a turbine in order to generate a mechanical energy (to e.g. a turbo compressor or for the propulsion of the vehicle), expanded over an exhaust brake damper (in order to increase losses in the engine and brake the vehicle or in order to generate warmer exhausts to optimise the exhaust treatment), cooled over an WHR plant and/or purified in a more or less advanced exhaust treatment plant.

The components in the exhaust system in which the concentration/fraction and temperature in/on the exhaust stream (or the bulk flow of the exhaust stream) may need to be regulated are, according to one embodiment of the invention: the high pressure part of the exhaust and EGR system (upstream of the turbo turbine) and pipe elements in the low pressure part before and after restrictions, such as an exhaust brake, catalyst or catalyst bypass and after urea and HC dosage systems. The concentration/fraction in the gas in catalysts (e.g. DOC, ASC and SCR), traps (e.g. NOx trap) and filters, both bulk and those inside the boundary layer against the component surface, may need to be regulated.

Further, according to one embodiment of the invention, the first concentration/fraction $C_1/X_1$ and/or the second concentration/fraction $C_2/X_2$ is a concentration/fraction of one or several substances from the group comprising: oxygen $O_2$, carbon dioxide $CO_2$, carbon oxide CO, sulphur oxides $SO_x$, nitrogen oxides NOx, nitrogen oxide NO, nitrogen dioxide $NO_2$, nitrous oxide $N_2O$, ammonia $NH_3$; and particles such as soot, HC drops and ash.

Preferred concentrations/fractions in the exhaust pipe after the final exhaust treatment step (the step immediately after before the exhausts leave the exhaust pipe, i.e. the step following which the exhaust emissions must meet the statutory requirements) are those which, with a minimal total fuel and urea consumption, meet the statutory emission requirements. The preferred values for a $NO_2/NO_x$ ratio entering the SCR catalyst are around 50%, for example between 40-60% for the best conversion grade of $NO_x$ to be achieved. The preferred $NO_2$-content upstream of the particulate filter (DPF), however, is heavily dependent on temperature and the $NO_x/PM$ relationship. Further, certain components in the exhaust system are sensitive to certain substances in certain phases. For example, $NO_x$ sensors are sensitive to water in liquid form. If the sensors come into contact with liquid water, there is a risk they may be damaged, which is why the preferred concentration of liquid water drops in this case is zero. In order to achieve this preferred concentration of liquid water drops, the preferred concentration margin, i.e. the difference between the concentration of water in gaseous form in the exhausts and the concentration of evaporated water on the liquid surface, is maximised during an integrated period of time.

Other ways of regulating the concentration/fraction with a method according to the present invention is, for example, to reduce the oxygen concentration in the exhaust system so that a local or global excess temperature is prevented in components such as the particulate filter, the diesel oxidation catalyst, the SCR dosage device and the SCR catalyst.

According to one embodiment of the invention, the one or several first parameters $P_1$ are selected from a group comprising:

a first concentration/fraction $C_1/X_1$ which may be a concentration/fraction in an area of the exhaust stream or a concentration/fraction in the exhaust stream on/nearest a surface or substrate in any part or component of the exhaust system, such as a particulate filter, catalyst, silencer, sensor, etc.; and a second current concentration/fraction difference between the first concentration/fraction $C_1/X_1$ and a concentration/fraction $C_2/X_2$ in the exhaust system. The second concentration/fraction $C_2/X_3$ is a different concentration/fraction in the exhaust stream from the first concentration/fraction $C_1/X_1$. However, the second concentration/fraction $C_2/X_3$ may be a concentration/fraction in an area of the exhaust stream.

According to another embodiment of the invention, one or several of the first parameters $P_1$ is a time derivative and/or time integral of the first concentration/fraction $C_1/X_1$, or the first concentration/fraction difference, or the second concentration/fraction difference. The use of a time derivative is advantageous if the control system is to react quickly to a concentration/fraction change, while the use of a time integral instead entails that the control system take into consideration long term trends in the concentration/fraction change, which is advantageous for long term control of the concentration/fraction in the exhaust system The above mentioned current concentrations/fractions and concentration/fraction differences and functions thereof may be based on sensor values obtained from one or several sensors arranged at, in connection with, or inside the exhaust system. Signals from sensors may be sent over a communications bus or a wireless link, for example, to one or several control devices for signal processing. Also, the concentrations/fractions and concentration/fraction differences as well as functions thereof may be based on so-called virtual sensors, i.e. (current) sensor values which are calculated with other real sensor signals with the use of one or several sensor models.

The advantage of using current concentrations/fractions and concentration/fraction differences and functions thereof is that these may be used directly for the determination of the first parameter $P_1$ without complex or resource-demanding calculations with the use of various simulation models. Thus, these current values may also be obtained quickly.

According to another embodiment of the invention, one of the one or several first parameters $P_1$ are calculated (predicted) values selected from a group comprising:

one calculated first concentration/fraction $C_1/X_1$ which may be a concentration/fraction in an area of the exhaust stream or a concentration/fraction in the exhaust stream on/nearest a surface or substrate in any part or component of the exhaust system, such as a particulate filter, catalyst, silencer, sensor, etc.;

a first calculated concentration/fraction difference between the first concentration/fraction $C_1/X_1$ and a second reference concentration/fraction $C_{Ref2}/X_{Ref2}$ in the exhaust stream. The second reference concentration/fraction $C_{Ref2}/X_{Ref2}$ is a desired concentration/fraction in e.g. a component, such as a particulate filter or a catalyst, in the exhaust system in order for it to function as well as possible or not to be damaged;

a second calculated concentration/fraction difference between the first concentration/fraction $C_1/X_1$ and a concentration/fraction $C_2/X_2$ in the exhaust stream. The second concentration/fraction $C_2/X_2$ is another concentration/fraction in the exhaust system than the first concentration/fraction $C_1/X_1$. However, the second concentration/fraction $C_2/X_2$ may also be a concentration/fraction in an area of the exhaust stream or a concentration/fraction in the exhaust stream on/nearest a surface or substrate in any part or component of the exhaust stream such as a particulate filter, catalyst, silencer, sensor, etc.;

a third calculated concentration/fraction difference between the second predicted concentration/fraction difference and a reference concentration/fraction $C_{Ref}/X_{Ref}$ in the exhaust system; and a time derivative and/or a time integral of the calculated first concentration/fraction $C_1/X_1$, or the first calculated concentration/fraction difference, or the second calculated concentration/fraction difference, or the third calculated concentration/fraction difference. The use of a time derivative is advantageous if the control system is to react quickly to a concentration/fraction change, while the use of a time integral instead entails that the control system takes into consideration long term trends in the concentration/fraction change, which is advantageous for long term control of the concentration/fraction in the exhaust stream.

By using one or several first predicted parameters $P_1$, information is obtained regarding how the relevant parameters will vary over time which means that the system for the regulation of the concentration/fraction of substances in the exhaust stream may be controlled so that the desired concentration/fraction may be achieved in the best possible manner in the future. This applies in particular to slow systems in which a change of a concentration/fraction takes a long time to change, e.g. via storage in catalysts or other components, which require early measures for the avoidance of overshoots in the regulation of a concentration/fraction.

Calculated parameters means that they are calculated or simulated in advance based on (mathematical) models of the vehicle and/or the components comprised in the vehicle. Based on one or several calculated first parameters $P_1$, a control strategy for the control of the gear in the gearbox may be selected among several different possible control strategies. By calculating/simulating how the first parameters $P_1$ will vary over the road sections lying ahead for the vehicle, according to one or several different control strategies, the control strategy which meets certain requirements, e.g. that the concentration/fraction remains within a predefined limit value while being optimal from another perspective, for example fuel and/or urea consumption, may be selected. The above therefore entails that the one or several first parameters $P_1$ may also be calculated based on one or several different future control strategies for the gearbox. This embodiment thus pertains to a feedback method where one or several first parameters $P_1$ are used for the calculation of one or several control strategies based on one or several possible operating points, i.e. operating points which may possibly be used having regard to other requirements such as e.g. driveability or fuel consumption. The one or several control strategies are subsequently used in order to calculate a new one or several first parameters, or in order to update the existing parameters. Further, it should be noted that even if only one control strategy is calculated, information derived from this only one control strategy may be used by the control system in order to determine whether it may reasonably be used or whether it is better to let the vehicle be driven with the current operating point for the control of the gearbox.

As mentioned above, the inventors have thus realised that the one or several calculated first parameters $P_1$ may be calculated over a road section ahead of the vehicle, for example by simulation over the road section ahead. According to this embodiment, the calculated first parameters $P_1$ may be determined based on one or several vehicle-specific and/or road-specific data for the vehicle. These may preferably be selected from the group comprising: inclination of the road ahead of the vehicle, curve radii of the road section ahead, speed limits of the road section ahead; motor vehicle weight; rolling resistance of the motor vehicle; air resistance of the motor vehicle; engine-specific data such as maximum output, minimum output, maximum torque, minimum torque, exhaust flow, exhaust gas recirculation content and lambda values (i.e. air/fuel mixture); and installation-specific data such as the possible accumulation of substances and/or release of substances and/or conversion of substances in the exhaust system and a surface in the exhaust system in contact with the exhaust stream. Further, driver-interactive data which is related to the driver's driving style may be used in connection with the calculation of the one or several first parameters $P_1$ so that the vehicle's future behaviour is taken into account when the calculation is made. Examples of driver-interactive data include the use of blinkers, gas pedal position, and use of brakes.

One advantage with the use of vehicle-specific and/or road-specific data for control is that the system may determine in advance whether any control strategy for one or several functions (e.g. gearing, external load, external heater, regulations of flow, etc.) needs to be used for the concentration/fraction not to end up outside a preferred interval. Thus, the use of unnecessary control strategies is avoided and also the system may act proactively in the event any measure should be required, i.e. the system may act in advance.

According to one special embodiment, the first concentration/fraction $C_1/X_1$ is a concentration/fraction in the gas stream, or a concentration/fraction over a liquid, or a particle in the exhaust stream, and the second concentration/fraction $C_2/X_2$ is a concentration/fraction in the exhaust stream on/nearest a surface or substrate in the exhaust system. The surface concentration/fraction is a concentration/fraction in the gas on/nearest a surface of the exhaust system or on a part thereof, which impacts the transport of the substance to and from the surface and the chemical reactions on the surface. The concentration/fraction over a liquid refers to the concentration/fraction on a surface in the exhaust system. This concentration/fraction over a liquid will impact the transport of substance amounts to or from the liquid, e.g. condensation or evaporation. The liquid may in this case consist of e.g. urea, water or fuel. The concentration/fraction immediately over a particle in the gas will on the other hand determine the reaction speed such as growth, decomposition or oxidation for the particle which in this case may be e.g. a soot or urea particle in the exhaust system.

According to another embodiment, the first concentration/fraction $C_1/X_1$ is a concentration/fraction in the exhaust stream upstream of an area in the exhaust system at which a concentration/fraction is desired to be obtained. This is especially advantageous where the conversion level of a component comprised in the exhaust system (e.g. a particulate filter or catalyst) is unambiguous, so that the output concentration/fraction will be determined by the input concentration/fraction and/or the fraction entering the component. This is the case e.g. in an equilibrium-controlled conversion of NO into NO2 in a diesel oxidation catalyst (DOC) or conversion of $NO_x$ in an SCR catalyst at high temperatures. It is also particularly advantageous if a particulate filter (DPF) is about to overheat and the overheating process may be stopped by removing oxygen in the particulate filter.

Further, it should be understood that the one or first parameters $P_1$ used in the control of the gearbox may consist of only current values, or consist of only calculated values, or be a combination of current and calculated values depending on the application.

The control of the gearbox may according to another preferred embodiment take place by calculating an operating point for the combustion engine based on the one or several first parameters $P_1$. Subsequently, the calculated operating point is used to control gears in the gearbox and thus to regulate the concentration/fraction in the exhaust stream. Generally, a desired/optimal operating point is selected among several possible operating points, and subsequently the driveline is controlled, e.g. by control of the gearbox in this case, so that the engine approximates the optimal operating point. A desired/optimal operating point means an operating point which is the best among all possible operating points for the purpose which the system wishes to achieve. In this case, the best operating point is the operating point which causes the concentration/fraction in the exhaust stream to approximate its corresponding reference concentration/fraction as much as possible. In other cases, it may relate to e.g. an operating point which leads to the lowest consumption of e.g. fuel or urea having regard to the statutory emission requirements and driveability, etc.

Usually, a gearbox is controlled to approximate an engine speed and thus an operating point so that the best total efficiency is achieved in the driveline, but driveability aspects are usually also taken into consideration. For example, the engine speed may be set higher than optimal in order for a torque reserve to be available if the driver accelerates before an uphill slope, for example. According to the above embodiment, the concentration/fraction in the exhaust stream is used as a parameter for the calculation of gears and engine speed, and thus emission targets are also taken into consideration when selecting gears. Thus, the emission target may be achieved without requiring any additional fuel-demanding measures. Alternatively, it is not necessary to equip the vehicle with additional parts/components in order to maintain a determined conversion level, or determined emissions, in the flow emitted from the catalyst, for example.

Normally, the gear is selected so that a desired drive power requirement may be delivered, i.e. that the driver's request is complied with to the greatest extent possible. However, in certain cases, the control system may deviate from this principle and instead allow the drive power to be intentionally lower than requested by the driver/vehicle. This means that the system allows the gearbox to remain in a higher gear and thus intentionally lets the engine remain at a lower engine speed than what is required in order to deliver the drive power requested.

All concentrations/fractions of different substances do not behave in the same manner on a load increase or a load decrease. Based on knowledge regarding fundamental combustion relationships, emission chemistry, the exhaust treatment system and the engine's control strategy with respect to e.g. the air/fuel relationship, load pressure, EGR content, injection time(s), and dosage of substances in the exhaust system, a person skilled in the art knows how engine load and engine speed should be varied in order to achieve a change of a given concentration or fraction. With respect to a change in a concentration/fraction over catalysts in the exhaust system, their efficiency generally deteriorates with an increased flow and falling temperature. With a given drive power requirement, generally the efficiency will thus decrease when the engine speed increases. However, there are exceptions, and therefore in practice virtual sensors are also used here in order to decide in which direction the engine speed should be changed. In practice, this is realised with the use of one or several virtual sensors arranged to calculate a quantity such as a concentration or fraction of substances. With the use of sensor values from the sensors, the engine load and the engine speed may be controlled for the regulation of a concentration/fraction. It should therefore be noted that the same driving case which in one case results in a downshift may in another case result in no measure, or result in an upshift depending on which substance the concentration/fraction of which is to be regulated.

The calculation of the gears may also be based on further parameters related to:
an efficiency level for the driveline, which must be taken into consideration in order to achieve as fuel efficient driving of the vehicle as possible;
a requested drive power requirement, which is usually used for the vehicle to be driveable, i.e. have the characteristics that it may be driven in a comfortable manner and in a manner where the vehicle to the greatest extent possible behaves as requested by the driver, e.g. maintains a certain speed, delivers the torque requested by the driver with the gas pedal, etc.;
speed limits in the engine and the driveline in order not to land higher or lower in engine speed than what the driveline is dimensioned for;
the engine's torque/power curve as a function of the speed in order to determine how much torque is available after a gear shift;
vehicle and road characteristics, such as vehicle weight, rolling resistance, air resistance and road inclination are used to calculate how much drive power is needed;
an efficiency for an exhaust treatment system (also called aftertreatment system) installed in the exhaust system in order to achieve as high conversion levels in catalysts and thus as low emission levels as possible;
exhaust emissions for the combustion engine before they have been purified by an exhaust treatment system;
a torque response, i.e. how quickly a requested increased drive wheel torque impacts on the vehicle's actual drive wheel torque. This aspect is relevant in the calculation of the operating point, since the driver's control of the gas pedal must also be taken into consideration. Otherwise there is a risk that the driver perceives that the vehicle does not respond to the driver's control of the gas pedal, and
other driveability aspects, such as noise, vibrations, and turning of the vehicle so that the vehicle may be driven comfortably.

Parameters related to external load are also very useful in the calculation and control of the operating point. Examples of external loads are a system arranged for the conversion of exhaust heat into energy (WHR); auxiliaries such as a water pump, fan or compressor; generator; hybrid generator or similar energy recycling system; retarder, exhaust brake or other auxiliary brake. The external load's power requirement may be controllable, so that the freedom in selecting an operating point for the engine is increased, which in turn means that also operating points which lie outside the vehicle's driving power requirement may be used for the regulation of the concentration in the exhaust system. In some cases the external load is of the "on" or "off" type, i.e. it is either activated or not, and in these cases the control and calculation of the operating point is limited to determining whether or not the external load should be activated.

Further, if no exhaust brake is installed in the exhaust system or if the exhaust brake is arranged to regulate the exhaust stream downstream of the same, the external load must be increased if a total concentration $C_{ExTot}$ in the exhaust stream is to be reduced; and if the total concentration $C_{ExTot}$ is to be increased, the external load must be reduced. On the other hand, if an exhaust brake is installed in the exhaust system and arranged to regulate an exhaust stream upstream of the brake, the external load must instead be increased if the total concentration $C_{ExTot}$ in an area upstream of the exhaust brake is to be increased in the event that a quota for the pressure above the temperature increases. In the reverse, the external load must be reduced if the total concentration $C_{ExTot}$ in the area is to be reduced in case the quota for the pressure above the temperature decreases. The total concentration's dependency on the external load is given by the general gas law. With an increased load, the temperature of the exhausts normally increases, and thus the total concentration falls given that the pressure is kept constant.

When it comes to selecting an operating point among a number of candidate operating points, the number of candidate operating points according to one embodiment shall consist of operating points that may be achieved having regard to a speed in the vehicle and the gears available in the gearbox. Further, as mentioned above, the engine torque may be varied with the help of the external load, however, the engine speeds which is still available are limited to those which may be achieved based on the vehicle's speed and gears available in the gearbox. The speed of the vehicle may either be the current speed, the desired speed or a calculation of how the speed will behave in the future.

In order to further increase the freedom in the selection of an operating point, the vehicle's speed may also be selected based on an operating point calculated as per above. This embodiment is especially suitable in cases where the vehicle has a cruise control system installed and activated. A speed offset value may then be used to regulate a cruise control reference value, which is a value specified by the driver and indicates the speed which the vehicle must maintain in cruise control. This means that the speed offset value is added to or subtracted from the cruise control reference value. In this case, the possibilities of achieving the optimal operating point are increased since the number of possible operating points increases with respect to the engine speed, as it is linear depending on the vehicle's speed.

Further, the following principles for control of the gearbox are applicable for the engine to reach a desired temperature: downshift to a lower gear and thus a higher engine speed and lower torque (and thus a higher flow and colder exhausts and higher total concentration) if a value for the one or several first parameters $P_1$ passes a first threshold value; and upshift to a higher gear and thus a lower engine speed and a higher torque (and thus a lower flow and warmer exhausts and a lower total concentration) if a value for the one or several first parameters $P_1$ passes a second threshold value. The first and second threshold values may assume, or be dependent on any value within, or in the vicinity of the concentration/fraction intervals which have been discussed previously. Preferred concentrations/fractions in the exhaust pipe after the final exhaust treatment step (the step immediately before the exhausts leave the exhaust pipe, i.e. the step following which the exhaust emissions must meet the statutory requirements) are those which, with a minimal total fuel and urea consumption, meet the statutory emission requirements. The preferred values for a $NO2/NO_x$ ratio entering the SCR catalyst are around 50%, for example between 40-60%, for the best conversion grade of $NO_x$ to be achieved. The preferred NO2-content upstream of the particulate filter (DPF), however, is heavily dependent on temperature and the $NO_x/PM$ relationship.

The inventors have also realised that the one or several first parameters $P_1$ are suitable for the control of other functions in the vehicle for regulation of the concentration/fraction of substances comprised in the exhaust system. These functions must have a direct or indirect impact on the concentration/fraction in the exhaust system. Thus, the regulation of the concentration/fraction may be more efficient and faster. Suitable functions are related to the conversion of exhaust heat into energy; external heating of the exhaust system; injection of fuel into the engine; injection of fuel, urea or other suitable liquids to the exhaust system; and regulation of the exhaust flow. It should be realised that the one or several first parameters $P_1$ may be used to control such a function or a combination of two or several such functions.

The one or several first parameters $P_1$ may be used for the control of a system arranged for conversion of exhaust heat into energy (Waste Heat Recovery, WHR). The regulation of the temperature with the system for the conversion of exhaust heat into energy takes place according to one embodiment by maximum energy in relation to the input energy, or total converted energy, being taken out via the system. This regulation is preferably aimed at maximising the heat conduction into the system and is designed for example as a PID or MPC regulator (Proportional Integral Derivative, PID; Model Predictive Control, MPC).

Further, the one or several first parameters $P_1$ may be used for the control of at least one external heater for the exhaust system. The external heater's task is to increase the concentration/fraction in the exhaust flow or any part/component in the exhaust system. Preferably the external heater is:

a burner installed in the exhaust system after the combustion engine's cylinders;
a system arranged for the injection of hydrocarbons for oxidation or combustion on a catalyst placed in the exhaust system;
an electric heater installed in the exhaust system after the combustion engine's cylinders; or
any other suitable external heater installed in, or in close connection with the exhaust system.

The external heater is preferably controlled so that a maximum concentration increase is obtained in relation to the input energy or so that the temperature increase is maximised. However, the external heater may instead be controlled so that the temperature increase speed is prioritised. The control of the external heater may be configured as a PID or MPC regulator.

As mentioned above, the one or several first parameters $P_1$ may also be used for control of a fuel injection system arranged for injection of fuel to the combustion engine for the regulation of the concentration/fraction in the exhaust system. This may occur through control of the number of post injections, the time (CAD) for the post-injections, the pressure of the post-injections, and the fuel amount per post-injection. The control of the fuel injection system may be implemented as pre-controlled or feedback control with e.g. MAP (matrix-based regulation structure), PID or MPC. As a setpoint for this control, a temperature which is downstream of the engine as well as a component in the exhaust system, e.g. a diesel oxidation catalyst (DOC) or as a concentration/fraction difference over the component may be used. In one embodiment, the regulation compensates for the efficiency of reactions in a component comprised in the exhaust system, for example the efficiency for NO into NO2 conversion in a diesel oxidation catalyst. Further, the one or several first parameters $P_1$ may be used for the control of an injection system arranged for the injection of fuel, urea or another suitable liquid to the exhaust system for regulation of the concentration/fraction $C_{Ex}/X_{Ex}$ of one or several substances comprised.

Another factor impacting the concentration/fraction in the exhaust stream $$\frac{C_{Ex}}{X_{Ex}}$$

is the characteristics for the exhaust flow in the exhaust stream. For this reason, the one or several first parameters $P_1$ may also be used for the control of the exhaust flow, or one of the exhaust flows depending on the parameter, for example mass transfer coefficients.

Figure 3:
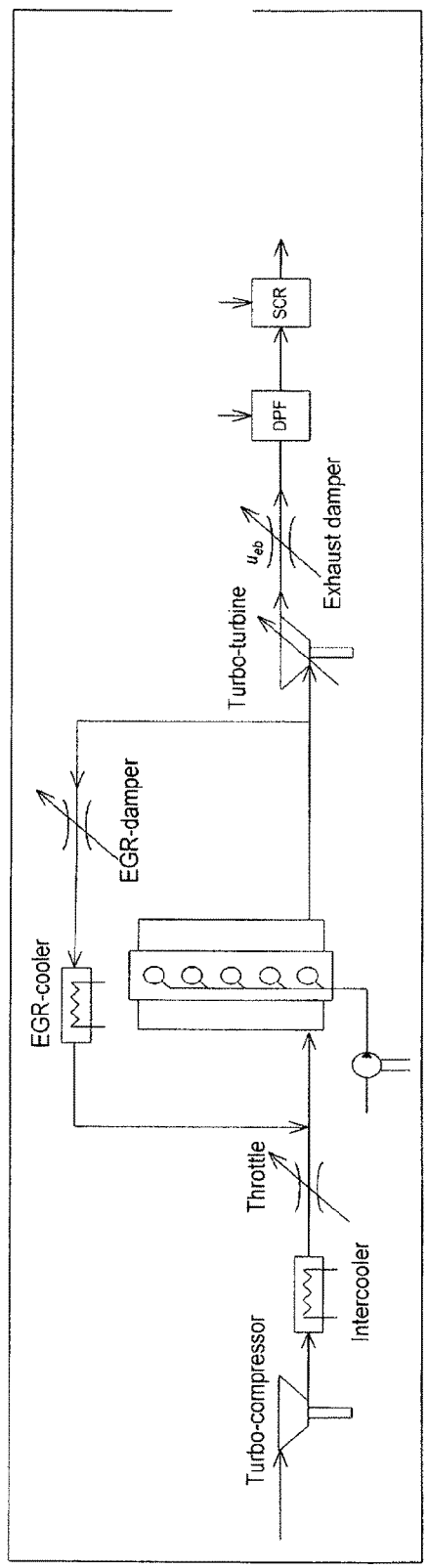
FIG. 3 is a schematic diagram of a gas flow in an engine system.

Control of the exhaust flow may for example occur through control of a gas flow system for exhaust gas recirculation (EGR) and/or through control of an intake system for the engine. FIG. 3 shows schematically a general gas flow in an engine system, where the engine system in this example comprises a diesel engine with a turbo and a number of pipes connected to the engine. Air is sucked in from the left in FIG. 3 with an intake system for the engine. The air which is sucked in passes through an intake pipe and is compressed in a turbocharger in order to be cooled subsequently by an intercooler before it passes, in certain cases, a throttle butterfly that regulates the amount of air into the diesel engine. The air is then mixed with recirculated exhausts with a gas flow system for exhaust gas recirculation (EGR) and this mixture is then sucked into the engine's cylinders in order to be mixed with diesel or another fuel before combustion occurs in the engine.

The exhausts from the combustion process then pass through a turbo turbine which sets the turbocharger into motion. Parts of the exhausts, however, enter into an EGR pipe and are led back to the intake pipe via an EGR damper and one or several EGR coolers. The EGR damper's function is to regulate the amount of recirculated exhausts back to the combustion process. When the EGR gases are cooled, the use of EGR will move heat energy from the exhausts to the engine's cooling system. Before the exhausts disappear entirely from the engine system, in some engines they pass through an exhaust damper (if installed), which controls the pressure in an exhaust collector (not shown in the figure). Subsequently, the exhausts pass through an aftertreatment system which may contain a diesel particulate filter and/or an SCR catalyst as mentioned previously. If the engine 101 is not heavily loaded, the exhausts will have a lower temperature than desired and thus cool the catalyst. One way of limiting the amount of cooling exhausts is to use a damper arranged in an intake pipe for air to the engine. Thus, the amount of air entering the engine may be limited, which in turn means the exhausts exiting the engine are also limited, which, with a given load, results in warmer exhausts with a usually higher fraction of combustion products. This damper is usually called a throttle butterfly, as mentioned above. The amount of air which the engine consumes is determined to a large extent by the speed of the engine, which in this case means that: the higher the engine speed, the more air flow is required to the engine.

According to the present invention, the one or several parameters $P_1$ may be used to control the gas flow system for exhaust gas recirculation (EGR) and/or the air intake system arranged for the regulation of an air flow to the engine. In addition, the control of the gas flow system for exhaust gas recirculation (EGR) may be controlled with an additional parameter related to emissions produced by the combustion engine. Emissions in this context mean, for example, exhausts and noise. Further, a reduction of the exhaust flow may be combined with an increase of the engine load to change the fraction of a component comprised in the exhaust system. This embodiment may be realised with, for example, pre-controlled or feedback control of an exhaust brake with the use of: a setpoint for the fraction or a value which is a function of the setpoint for the fraction.

Figure 5:
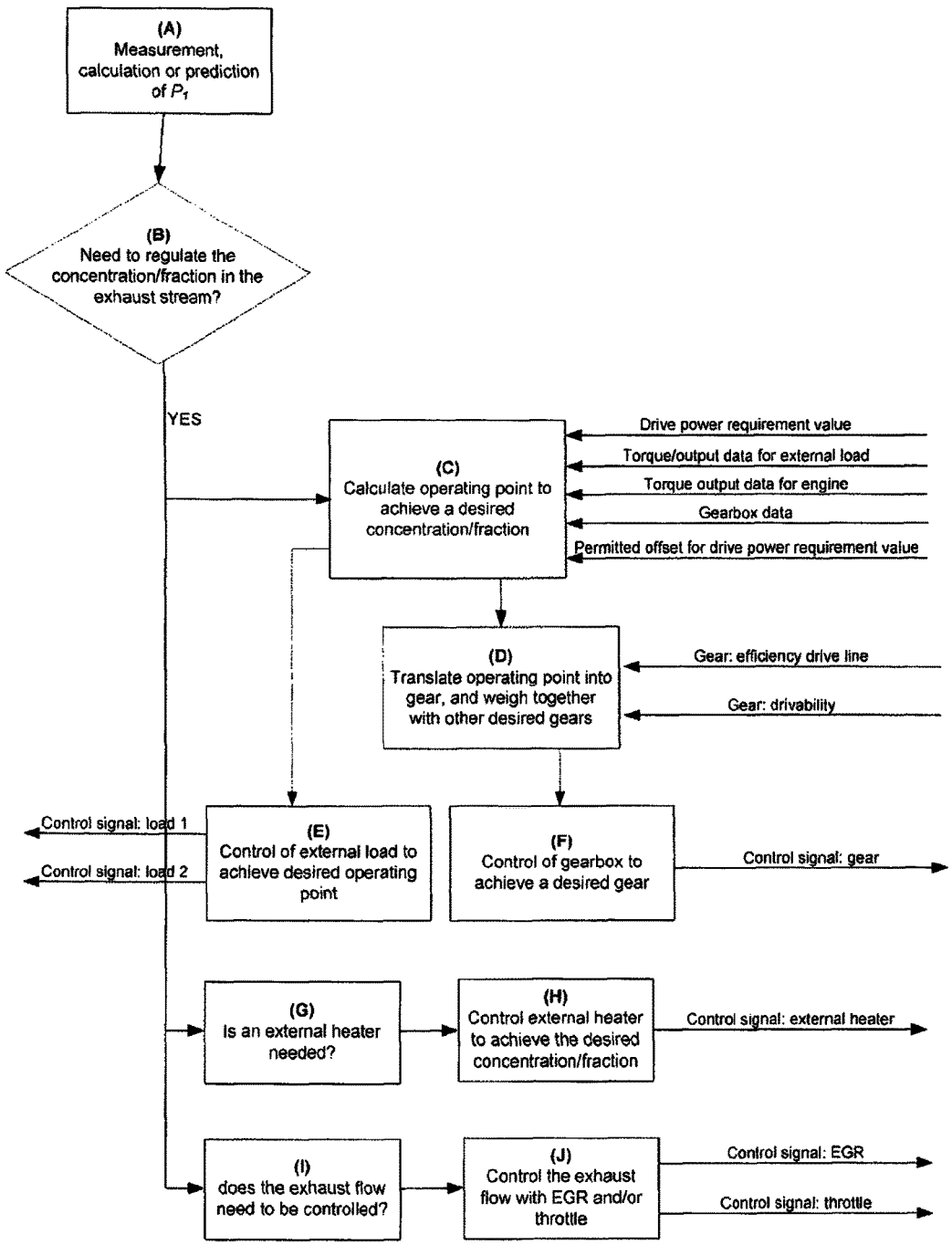
FIG. 5 shows a flow diagram of one embodiment of the invention.

Further FIG. 5 shows a flow diagram of an exemplified embodiment of the method according to the invention:

A. At A, the first parameter $P_1$ from other sensor signals (virtual sensor) is measured or calculated. The first parameter $P_1$ may also be calculated over the road section ahead for the vehicle at A.

B. Based on the value of the first parameter $P_1$ at B it is decided whether a concentration/fraction regulating measure needs to be taken. This may, for example, take place by a comparison of the first parameter $P_1$ with a threshold value, or by comparing several calculations of the first parameter $P_1$ with related control strategies and based on these selecting which regulations measure (s) that need(s) to be taken.

C. If a regulating measure is to be taken, then at C the operating point for the engine which best (e.g. in the fastest or most fuel efficient manner) leads to a desired concentration/fraction is calculated at C. Other parameters may also be taken into consideration in the calculation at C, such as the drive power requirement value, torque/output data for external loads, etc.

D. The operating point calculated at C is translated at D to a gear among the discrete gear steps available. At D the desired gear is also weighed up with desired gears with respect to other aspects, such as driveability aspects and total efficiency for the driveline.

E. At E the external load is set at the desired value corresponding to the desired operating point calculated at C (desired torque).

F. At F the gearbox is controlled so that a desired gear is engaged, which is achieved by the control system engaging the desired gear in the automatic gearbox or by the desired gear being presented/indicated to the driver so that the latter manoeuvres the manual gearbox to engage the desired gear.

G. If the adjustment of the operating point (gear and external load) is not sufficient to achieve the desired concentration/fraction, it is decided at G whether an external heater should be activated. However, the external heater could have been activated already at B.

H. At H the external heater is controlled following the decision at G.

I. If the adjustment of the operating point is insufficient to achieve a desired concentration/fraction in the exhaust system, it is decided at I whether the exhaust flow needs to be controlled with e.g. the help of an EGR and/or a throttle butterfly.

J. At J the exhaust flow is controlled after the decision at I.

The present invention may also be implemented in a control system arranged to control all or parts of a driveline in a motor vehicle 100. Further, the system may comprise additional control devices arranged to control other functions such as external load, external heater, etc. Control devices of the type displayed are normally arranged to receive sensor signals from different parts of the vehicle as well as from other control devices. These control devices are also usually arranged to emit control signals to different vehicle parts and vehicle components. The control devices may also comprise, or be connected to, a calculation device arranged for the calculation/simulation of predicted parameter values.

Generally, control systems in modern vehicles consist of a communications bus system consisting of one or several communications buses for the connection of a number of electronic control devices (ECUs) or controllers 115, 208 and different components arranged on the vehicle. Such a control system may comprise a large number of control devices, and the responsibility for a specific function in the vehicle may be distributed among one or more control devices.

The control usually takes place with programmed instructions. These programmed instructions typically consist of a computer program, which, when it is executed in a computer or control device, causes the computer/control device to carry out the desired control, such as methods according to the present invention. The computer program usually consists of a computer program product, where the computer program product comprises an applicable storage medium 121 with the computer program 109 stored on the storage medium 121. The digital storage medium 121 may e.g. consist of any from the following group: ROM (Read-Only Memory), PROM (Programmable Read-Only Memory), EPROM (Erasable PROM), Flash, EEPROM (Electrically Erasable PROM), a hard disk unit, etc., and may be set up in or in combination with the control device, whereby the computer program is executed by the control device.

Figure 4:
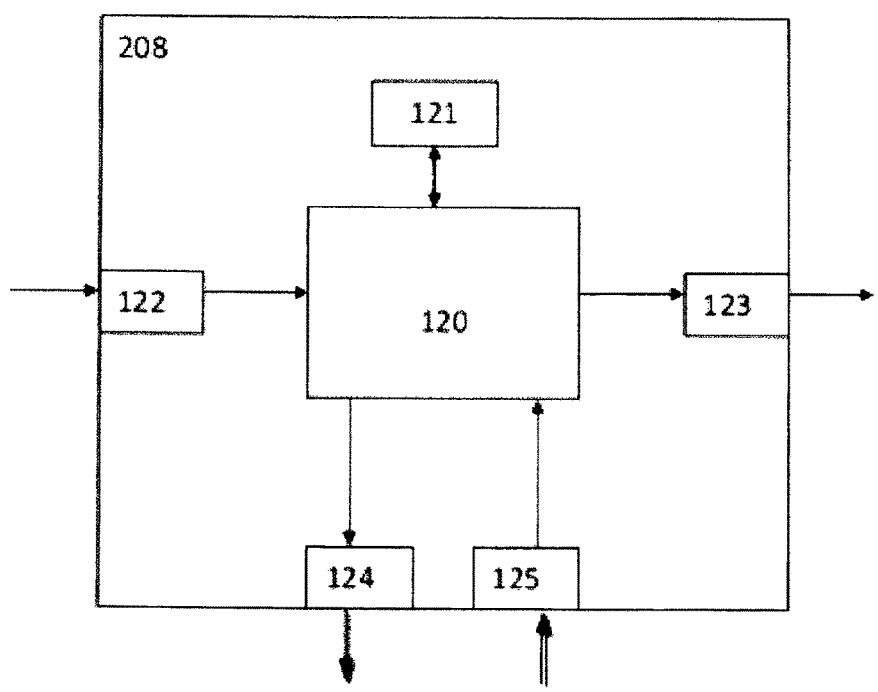
FIG. 4 is a schematic diagram of a control device.

An example control device (control device 208) is displayed in the diagram in FIG. 4, and the control device in turn may comprise a calculation device 120, which may consist of e.g. a suitable type of processor or microcomputer, e.g. a circuit for digital signal processing (Digital Signal Processor, DSP), or a circuit with a predetermined specific function (Application Specific Integrated Circuit, ASIC). The calculation device 120 is connected to a memory device 121, which provides the calculation device with e.g. the stored program code 109 and/or the stored data which the calculation device needs in order to be able to carry out calculations. The calculation device is also arranged to store interim or final results of calculations in the memory device 121.

Further, the control device is equipped with elements/devices 122, 123, 124, 125 for receipt and sending of input and output signals, respectively. These input and output signals may contain waveforms, pulses, or other attributes, which may be detected by the devices for the receipt of input signals as information for processing by the calculation device 120. The devices 123, 124 for sending output signals are arranged to convert the calculation result from the calculation unit 120 to output signals for transfer to other parts of the vehicle's control system and/or the component(s) for which the signals are intended. Each one of the connections to the devices for receipt and sending of input and output signals may consist of one or several of a cable; a data bus, such as a CAN (Controller Area Network) bus, a MOST (Media Oriented Systems Transport), or any other suitable bus configuration; or of a wireless communications connection.

More specifically, a (control) system according to the present invention comprises: a control device arranged to control an automatic gearbox or a manual gearbox, and thus an operating point in a combustion engine, based on one or several first parameters $P_1$ for the regulation of a concentration/fraction $C_{Ex}/X_{Ex}$ of one or several substances comprised in an exhaust stream, where at least one of the one or several first parameters $P_1$ are a first concentration/fraction difference between the first concentration/fraction $C_1/X_1$ in the exhaust stream and a reference concentration/fraction $C_{Ref}/X_{Ref}$. As a person skilled in the art will realise, this system may be implemented in a control system described above. Further, the present invention also pertains to a motor vehicle 100, such as a bus, a truck or a similar motor vehicle, comprising at least one system according to the above.

Finally, it should be realised that the present invention is not limited to the embodiments of the invention described above, but pertains to and comprises all embodiments within the protected scope of the enclosed independent claims.

The invention claimed is:

1. A method for regulation of a concentration/fraction of one or several substances in an exhaust stream in a motor vehicle through control of a driveline of the vehicle;
   the motor vehicle comprises:
   a driveline comprising a combustion engine connected to a gearbox, wherein the gearbox has several discrete gears, and an exhaust system configured for removal of an exhaust stream from the combustion engine;
   the method comprises:
   regulating a concentration/fraction $C_{Ex}/X_{Ex}$ of one or several substances in the exhaust stream to achieve a desired concentration/fraction by controlling the gearbox, thereby controlling an operating point in the combustion engine, based on one or several first parameters $P_1$, wherein at least one of the one or several first parameters $P_1$ is a first concentration/fraction difference between a first concentration/fraction $C_1/X_1$ in the exhaust stream based on sensor values obtained from one or several sensors arranged at, in connection with, or inside the exhaust system, and a reference concentration/fraction $C_{Ref}/X_{Ref}$, the reference concentration/fraction being the desired concentration/fraction in the exhaust stream;
   wherein controlling the gearbox comprises:
   calculating at least one operating point in the combustion engine based on the one or several first parameters $P_1$; and
   controlling gears in the gearbox based on the calculated at least one operating point.

2. A method according to claim 1, further comprising at least one other of the one or several first parameters $P_1$ is another first concentration/fraction $C_1/X_1$ or is a second concentration/fraction difference between the another first concentration/fraction $C_1/X_1$ and a second concentration/fraction $C_2/X_2$ in the exhaust stream.

3. A method according to claim 2, further comprising the other first concentration/fraction $C_1/X_1$ is a concentration/fraction in the exhaust stream upstream of an area in the exhaust stream at which a concentration/fraction is desired to be obtained.

4. A method according to claim 2, wherein at least one another of the one or several first parameters $P_1$ is a time derivative or a time integral of the first concentration/fraction $C_1/X_1$ or the another first concentration/fraction $C_1/X_1$ or the first concentration/fraction difference or the second concentration/fraction difference.

5. A method according to claim 1, further comprising calculating at least one of the one or several first parameters $P_1$ over a road section ahead of the motor vehicle and based on one or several vehicle-specific and/or road-specific data for the motor vehicle.

6. A method according to claim 5, wherein the vehicle-specific and/or road-specific data are selected from the group comprising: a road inclination, curve radii, speed limits; a weight for the motor vehicle; a rolling resistance; an air resistance; engine-specific data including maximum output, minimum output, maximum torque, minimum torque, exhaust flow, exhaust recirculation content, lambda values, and injection parameters.

7. A method according to claim 2, wherein the other first concentration/fraction $C_1/X_1$ is a concentration/fraction of a gaseous substance or a concentration of fixed particles or liquid drops, and the second concentration/fraction $C_2/X_2$ is a concentration/fraction in the exhaust stream on/nearest a surface or a substrate in the exhaust system.

8. A method according to claim 2, wherein the first concentration/fraction $C_1/X_1$ and/or the another first concentration/fraction $C_2/X_2$ is a concentration/fraction of one or several substances from the group comprising: oxygen O2, carbon dioxide CO2, carbon oxide CO, sulphur oxides SOx, nitrogen oxides NOx, nitrogen oxide NO, nitrogen dioxide NO2, nitrous oxide N2O, ammonia NH3, and particles including soot, HC drops and ash.

9. A method according to claim 1, where the operating point is achieved having regard to a speed of the motor vehicle and the gears available in the gearbox.

10. A method according to claim 9, wherein the speed is any of a current speed, a desired speed or a calculated speed.

11. A method according to claim 1, wherein the calculating of the operating point is also based on one or several additional parameters related to at least one selected from the group comprising: a requested drive power requirement, efficiency of the driveline, efficiency of an exhaust treatment system installed in the exhaust system, exhaust emissions from the combustion engine, and a torque response.

12. A method according to claim 1, wherein the calculating of the operating point is also based on one or several additional parameters related to at least one external load on the engine selected from the group comprising: a system arranged for conversion of exhaust heat into energy (WHR); auxiliaries including a water pump, a fan or a compressor; a generator; a hybrid a generator, or an energy recycling system; retarder, exhaust brake or other auxiliary brake.

13. A method according to claim 12, further comprising, if no exhaust brake is installed in the exhaust system or an exhaust brake is arranged to regulate an exhaust stream downstream of the brake, the external load is:
  increased if a total concentration $C_{ExTot}$ in the exhaust system is to be reduced, and
  reduced if the total concentration $C_{ExTot}$ in the exhaust system is to be increased.

14. A method according to claim 13, wherein if an exhaust brake is installed in the exhaust system and is configured to regulate an exhaust stream upstream of the brake, the external load is:
  increased if a total concentration $C_{ExTot}$ in an area upstream of the exhaust brake is to be increased, and
  reduced if the total concentration $C_{ExTot}$ in the area upstream of the exhaust brake is to be reduced.

15. A method according to claim 1, further comprising the step:
  controlling a speed of the motor vehicle based on the operating point.

16. A method according to claim 15, further comprising controlling the speed of the vehicle by using at least one speed offset value added to or subtracted from a cruise control reference value.

17. A method according to claim 1, wherein controlling the gearbox comprises:
  downshifting to a lower gear, and thus increasing the engine speed and reducing a load on the combustion engine, if a value for the one or several parameters $P_1$ exceeds a first threshold value; and
  upshifting to a higher gear, and thus reducing the engine speed and increasing a load on the combustion engine, if a value for the one or several first parameters $P_1$ exceeds a second threshold value.

18. A method according to claim 1, further comprising:
  controlling at least one external heater that affects the exhaust stream and the controlling is based on the one or several first parameters $P_1$ for the reduction or increase of the concentration/fraction $C_{Ex}/X_{Ex}$ in the exhaust system.

19. A method according to claim 18, for a vehicle that has engine cylinders, and the method further comprises:
  selecting the external heater from the group comprising: a burner installed in the exhaust system after the combustion engine's cylinders; a system configured for injecting hydrocarbons for the oxidation or combustion of a catalyst placed in the exhaust system; an electric heater installed in the exhaust system after the combustion engine's cylinders; and another external heater installed in or in close connection to the exhaust system.

20. A method according to claim 1, further comprising:
  controlling a fuel injection system in the engine, wherein the injection system is configured for the injection of fuel to the combustion engine based on the one or several first parameters $P_1$ for the regulation of the concentration/fraction $C_{Ex}/X_{Ex}$ of one or several substances in the exhaust system.

21. A method according to claim 1, further comprising:
  controlling an injection system arranged for injection of fuel, urea or another liquid to the exhaust system based on the one or several first parameters $P_1$ for the regulation of the concentration/fraction $C_{Ex}/X_{Ex}$ of one or several substances in the exhaust system.

22. A method according to claim 1, further comprising:
  controlling an exhaust flow in the exhaust stream, or controlling a parameter depending on the exhaust flow, based on the one or several first parameters $P_1$ for the regulation of the concentration/fraction $C_{Ex}/X_{Ex}$ of one or several substances comprised in the exhaust system.

23. A method according to claim 1, further comprising:
  controlling a gas flow system for exhaust gas recirculation (EGR) configured for the combustion engine based on the one or several parameters $P_1$ for the regulation of the concentration/fraction $C_{Ex}/X_{Ex}$ of one or several substances in the exhaust system; and/or
  controlling an intake system configured for regulating an air flow to the combustion engine based on the one or several first parameters $P_1$ for the regulating of the concentration/fraction $C_{Ex}/X_{Ex}$ of one or several substances in the exhaust system.

24. A method according to claim 23, wherein the controlling of the gas flow system for exhaust gas recirculation (EGR) and/or controlling of the intake system is also based on an additional parameter related to emissions produced by the combustion engine.

25. A computer program product comprising a non-transitory computer readable medium and a computer program is in the non-transitory computer readable medium, wherein the program has code such that when the program code is read by a computer, the computer causes performance of the method of claim 1.

26. A system arranged for controlling a driveline in a motor vehicle, wherein the motor vehicle comprises:
  a driveline comprising a combustion engine which may be connected to a gearbox, the gearbox having several discrete gears; and
  an exhaust system configured for removing an exhaust stream from the combustion engine;
  a control device configured to control the gearbox to regulate a concentration/fraction $C_{Ex}/X_{Ex}$ of one or several substances in the exhaust stream, to thereby control an operating point in the combustion engine, based on one or several first parameters $P_1$, wherein at least one of the one or several first parameters $P_1$ is a first concentration/fraction difference between the first concentration/fraction $C_1/X_1$ in the exhaust stream based on sensor values obtained from one or several sensors arranged at, in connection with, or inside the exhaust system, and a reference concentration/fraction $C_{Ref}/X_{Ref}$, the reference concentration/fraction being a desired concentration/fraction in the exhaust stream,
  wherein the control device calculates the operating point based on the one or several first parameters $P_1$ to achieve a desired concentration/fraction, and controls the gearbox based on the calculated operating point.

27. A motor vehicle comprising a system according to claim 26.

* * * * *